United States Patent [19]
Tipton

[11] 3,897,719
[45] Aug. 5, 1975

[54] FLOW AND PRESSURE REGULATING CONTROL FOR HYDRAULIC MOTORS

[75] Inventor: Joe D. Tipton, Garland, Tex.

[73] Assignee: Gardner-Denver Company, Dallas, Tex.

[22] Filed: Dec. 13, 1973

[21] Appl. No.: 424,512

Related U.S. Application Data

[62] Division of Ser. No. 261,885, June 12, 1972, Pat. No. 3,799,200.

[52] U.S. Cl. ............... 91/433; 91/461; 137/625.66; 173/147
[51] Int. Cl.² .................... E21C 5/06; F15B 13/042
[58] Field of Search .................... 91/461, 304, 433; 137/625.6, 625.62, 625.66, 625.63, 625.69; 173/147

[56] References Cited
UNITED STATES PATENTS

| | | | |
|---|---|---|---|
| 1,858,774 | 5/1932 | Hansen | 173/160 X |
| 2,536,965 | 1/1951 | Taylor | 137/625.66 |
| 2,931,389 | 4/1960 | Moog, Jr. et al. | 137/625.62 |
| 2,964,059 | 12/1960 | Geyer | 137/625.62 |
| 3,015,317 | 1/1962 | Buchanan et al. | 137/625.62 |

FOREIGN PATENTS OR APPLICATIONS

| | | | |
|---|---|---|---|
| 1,426,471 | 11/1968 | Germany | 91/461 |

Primary Examiner—Irwin C. Cohen
Attorney, Agent, or Firm—M. E. Martin

[57] ABSTRACT

A hydraulic flow and pressure regulator control comprising a spool type valve which is self-centering and blocks a hydraulic fluid supply port in the centered position. Opposite ends of the valve spool are disposed in opposed chambers which are operable to receive pilot pressure fluid and fluid from the working discharge port of the valve, respectively. Shuttle valves disposed in the spool and the opposed chambers provide for reversible operation of the spool valve. The pressure regulator spool valve is operated to control flow, direction of flow, and pressure by a pressure differential control valve which can be manually operated to supply fluid at variable pressure to either of the opposed chambers. The flow and pressure regulator control is particularly adaptable for control of hydraulic feed or pull-down mechanisms for rock drills.

4 Claims, 4 Drawing Figures

3,897,719

FLOW AND PRESSURE REGULATING CONTROL FOR HYDRAULIC MOTORS

This is a division of application Ser. No. 261,885, filed June 12, 1972, now U.S. Pat. No. 3,799,200.

BACKGROUND OF THE INVENTION

In many fluid power operated devices it is desirable to control position and direction of movement as well as force or pressure exerted on or by the device itself. For example, in the art of rock drilling with drills mounted on elongate supports for reversible movement therealong it is desirable to be able to move the drill back and forth along the support at different speeds. It is also desirable to be able to accurately move the drill to a predetermined position on the support, and to control the drill to exert a predetermined feed force on the drill rod and bit, the latter control function being somewhat dependent on the rock conditions. Hydraulically controlled rock drill feed devices such disclosed in U.S. Pat. No. 3,189,103 to K.A.G. Attebo and certain other hydraulic motor applications requiring similar control functions require control circuits which include directional control valves, flow control devices and pressure regulators. In prior art hydraulic control systems it has usually been necessary to provide separate devices to provide for the various control functions required which has resulted in expensive and complicated hydraulic circuits with numerous conduits and component items. Particularly in rock drilling machinery where operating conditions are rigorous and abusive to equipment it is desirable to provide for hydraulic systems which have a minimum number of component items and accordingly a minimum number of fluid conduits and connections.

SUMMARY OF THE INVENTION

The present invention provides an improved pressure fluid flow and pressure regulating control which is operable to regulate the pressure of fluid supplied to a fluid motor or similar fluid power device to a pressure value corresponding to the pressure of a pilot fluid used to actuate the control. The present invention also provides a pressure regulating control which is operable to provide directional control of pressure fluid at a regulated pressure for reversible operation of a fluid motor or the like.

The pressure regulating control of the present invention comprises a control valve for supplying fluid directly to a reversible fluid motor or the like at a regulated pressure corresponding substantially to a pilot fluid pressure used to actuate the control valve.

With the control valve of the present invention a pressure fluid flow and pressure regulating control is provided which comprises a so-called four-way directional control valve combined with a fluid pressure regulator in a single valve which is also operable as a flow control valve capable of controlling a substantial range of fluid flow rates for operating reversible fluid motors and the like.

The flow and pressure regulating control of the present invention further includes a differential pressure control valve which is operable to supply pressure fluid at different pressures to pilot actuators or the like such as opposed pilot actuator chambers of the reversible flow control and pressure regulating valve of the present invention.

The present invention also provides an improved flow and pressure regulating control for fluid operated rock drill feed mechanisms whereby a simplified control circuit provides for reversible movement of a drill along a feed support at a desired speed and feed forcce for drilling, and at a desired speed for removal of the drill rod and bit from a drill hole. With a pressure fluid control circuit in combination with a fluid operated rock drill feed mechanism according to the present invention a simple and reliable control circuit is provided which controls drill feed force and drill position with great accuracy.

DESCRIPTION OF THE PREFERRED EMBODIMENT

Figure 1:
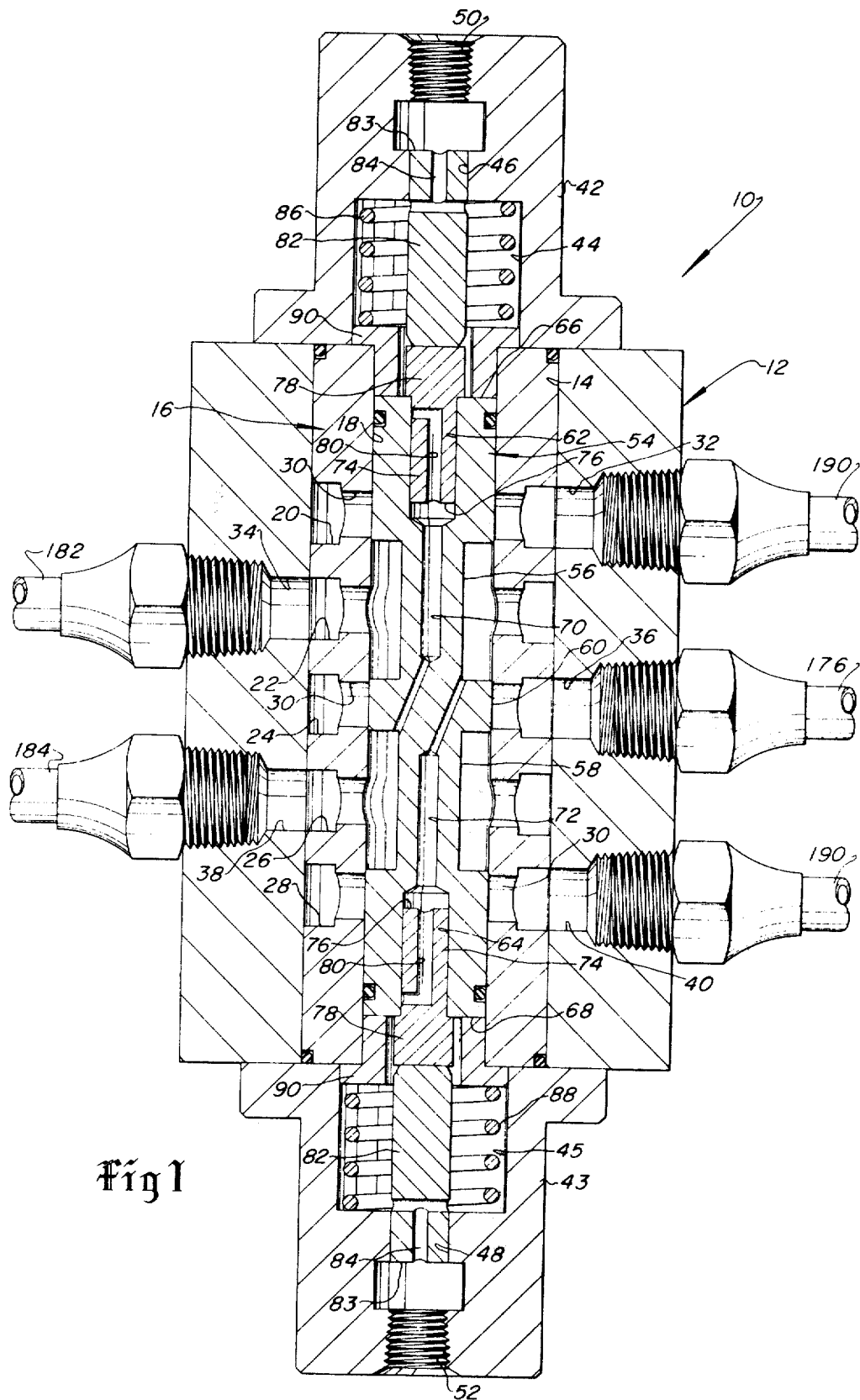
FIG. 1 is a longitudinal section view fo a fluid flow and pressure regulating control valve in accordance with the present invention.

Referring to FIG. 1 of the drawings a flow and pressure regulating control valve in accordance with the present invention is generally designated by the numeral 10. The valve 10 includes a housing 12 having a bore 14 in which is disposed, closely fitted, a cylindrical sleeve 16. The sleeve 16 is provided with a cylindrical bore 18, and with spaced apart circumferential grooves 20, 22, 24, 26, and 28, each groove having radially extending passages 30 opening into the bore 18. As shown in FIG. 1 the grooves 20, 22, 24, 26, and 28 are respectively in communication with ports 32, 34, 36, 38, and 40 in the housing 12. The sleeve 16 is retained in the housing 12 by opposed flanged cover members 42 and 43 suitably fastened to the housing and having, respectively, chambers formed by recess 44 and 45 opening toward the bore 18 of the sleeve. The cover members 42 and 43 are also provided with bores 46 and 48 which open from the recesses 44 and 45 to suitable threaded passages or ports 50 and 52.

The valve 10 also includes a cylindrical closure member or spool 54 movably disposed in close fitting relationship within the bore 18. The spool 54 is provided with circumferential recesses 56 and 58 and a portion 60 interposed between the recesses. The portion 60 is dimensioned to provide for blocking the flow of fluid from the supply port 36 to either of the recesses 56 or 58, in the position of the spool shown in FIG. 1. The recesses 56 and 58 are also proportioned such that the spool 54 blocks the ports 32 and 40 from communication with the recesses 56 and 58, respectively, in the position of the valve shown in FIG. 1. However, the spool 54 may be moved to connect port 32 with port 34 by way of recess 56, and port 36 with port 38 by way of recess 58. The spool 54 may also be moved in the opposite direction to connect port 34 with port 36 by way of recess 56 and at the same time connect port 38 with port 40 by way of recess 58.

The spool 54 is also provided with longitudinal chambers 62 and 64 which respectively open to opposed end faces 66 and 68. A passageway 70 connects chamber 62 with recess 58 and a passageway 72 connects chamber 64 with recess 56. The chambers 62 and 64 each include a cylindrical shuttle valve element 74 slidably disposed therein. The valve elements 74 are each characterized by an end face 76 and a flanged portion 78 which abut against the respective end faces of the spool 54. Passages 80 in the valve elements open into the respective chambers 62 and 64 and are operable to be in communication with the recesses 44 and 45 in the cover members 42 and 43 when suitably displaced within the chambers. Second shuttle valve elements 82 are slidably disposed in the bores 46 and 48 of the cover members 42 and 43 and are in abutting relationship with the valve elements 74. The valve elements 82 each include passage means 84 opening to the ports 50 and 52 respectively. The passages 84 are also in communication with the recesses 44 and 45 in the cover members 42 and 43 in the position shown in FIG. 1. Each of the valve elements 74 could be made integral with the associated valve element 82 but are made as separate pieces to avoid seizure of the valve elements due to misalignment of the bores 46 and 48 with respect to the chambers 62 and 64.

The valve spool 54 is biased to the centered position shown in FIG. 1 by opposed coil springs 86 and 88 disposed in the recesses of the cover members 42 and 43. The springs 86 and 88 each bear against a flanged collar 90. The collars 90 in turn bear against the end faces 66 and 68 of the spool 54 and are provided to assure that the spool is centered by the springs 86, 88, when no unbalanced fluid pressure forces are acting on the spool end faces.

The chambers formed by the recesses 44 and 45 together with the surfaces 66 and 68 on the spool 54 comprise means for moving the spool 54 to place the fluid supply port 36 in communication with either first port 34 or second port 38. For example, if pilot pressure fluid is introduced through port 50 and passage 84 in the valve element 82 into the recess 44 it will act on end face 66 to move spool 54 to connect port 34 with port 36 by way of recess 56 assuming, of course, that the pressure force exerted on end face 66 is great enough to overcome the bias force of the opposing spring 88. Such movement of the spool 54 will cause the shuttle valve 74 disposed in chamber 64 to move with the spool and move the valve element 82 disposed in bore 48 to a position which will block the passage 84 by the wall of the bore 48 thereby preventing communication of the port 52 with the recess 45. With the spool positioned as above described the port 38 will be in communication with port 40 by way of recess 58. The spool 54 may be moved in the opposite direction from the centered position to connect port 36 with port 38 by way of recess 58, and simultaneously, connect port 32 with port 34 by way of recess 56. By applying pressure fluid to port 52 and through the passage 84 to act on the end face 68 the spool 54 may be moved against the bias force of the spring 86 disposed in the recess 44. Any more than slight movement of the spool to connect port 36 with port 38 will prevent communication of the recess 44 with port 50 in the cover member 42 by moving the valve element 82 disposed in bore 46 to cause the passage 84 to be blocked by the wall of the bore 46. Although the valve elements 82 are closely fitted in the bores 46 and 48 to substantially block the passages 84 in certain positions of the spool, leakage of pressure fluid out of the recesses 44 or 45 between the bores 46 and 48 and the valve elements 82 can occur to permit movement of the spool 54 when the passages 84 are blocked. The movement of the spool to uncover the port 36 may be precisely controlled for either direction of movement by controlling the pressure of fluid applied to act on the end faces 66 or 68 to overcome the bias force of the respective opposing springs 88 and 86 and any opposing pressure force which may be acting on the surface 83 of a valve element 82. Accordingly, the valve 10 may be remotely controlled precisely to meter quantities of pressure fluid to either port 34 or port 38 by positioning the spool 54.

From the foregoing description it may be appreciated that the valve 10 provides for directional control of pressure fluid flow as well as control of the amount or rate of flow of fluid by precisely controlling the reversible movement of the spool (54) to uncover the port 36. The valve 10 is also operable to regulate the pressure of fluid flowing to either port 34 or 38 from port 36. For example, if pressure fluid is supplied to port 50 to cause the spool to move to connect port 34 with port 36 the passage 72 will conduct fluid from the recess 56 to the chamber 64 to act on the end face 76 of the valve element 74. A pressure force due to fluid acting on the valve element 74 will shift the valve elements 74 and 82 to place the passage 80 in communication with the recess 45 and chamber 64. Pressure fluid admitted to the recess 45 from recess 56 will act on the spool end face 68 tending to move the spool toward the centered position in opposition to pressure force exerted on the end face 66 by pilot pressure fluid supplied to recess 44. The pressure of the fluid in recess 45 will be essentially the same as the pressure in recess 56 when the recess 45 is not in communication with port 52 by way of the passage 84 in the valve element 82 due to movement thereof. It is assumed that under all operating conditions the end faces 66 and 68 have equal areas exposed to pressure fluid in the respective recesses 44 and 45. Accordingly, the spool 54 will move to control the flow of pressure fluid from the port 36 to regulate the pressure of fluid flowing to the port 34 to correspond substantially to the pressure of the pilot control fluid supplied to the recess 44 through port 50. The springs 86 and 88 may be provided with a spring rate or stiffness which will not have a significant effect on the pressure regulating operation of the valve 10 for the range of pressures normally encountered with hydraulic fluid systems.

The valve 10 may be operated in the same manner to regulate the pressure of fluid supplied to the port 38. If pilot pressure fluid is supplied to port 52 instead of port 50 the valve spool 54 will move to connect port 36 with port 38 and fluid in recess 58 will flow through passage 70 and move the valve element 74 in chamber 62 to place the passage 80 in communication with recess 44. Accordingly, pressure fluid from recess 58 will act on the end face 66 to move the spool 54 to control the flow of fluid from port 36 to port 38 until the pressure in recess 58 and port 38 corresponds substantially to the pressure of pilot control fluid supplied to recess 52.

The valve 10 therefore operates as a pressure regulating valve as well as a directional flow control and flow metering type of valve. When the valve 10 is operated to control flow to either port 34 or port 38 metering or flow control alone without pressure regulation will be provided as long as the passages in the valve elements 74 are blocked from communication with the recesses 44 or 45. Therefore, by controlling the fluid pressure to port 52 to provide a pressure force acting against surface 83 which will hold the valve element 74 in the position shown in FIG. 1 with respect to the spool 54, pressure fluid from recess 56 will be prevented from entering recess 45. Also, while controlling flow of fluid to the port 38 pressure fluid controlled to act against the surface 83 on valve element 82 disposed in recess 44 will accordingly prevent the associated valve element 74 from shifting to communicate pressure fluid to the chamber or recess 44 from recess 58 and port 38 as long as the pressure force on face 76 is less than the pressure force acting on surface 83. Therefore, the valve elements 74 comprise means responsive to a predetermined fluid pressure in either the first port 34 or the second port 38 acting on the surfaces 76 for moving the valve elements to place the recesses 56 or 58 in communication with the respective recesses 45 or 44 to cause the spool 54 to operate in the pressure regulating mode.

Figure 2:
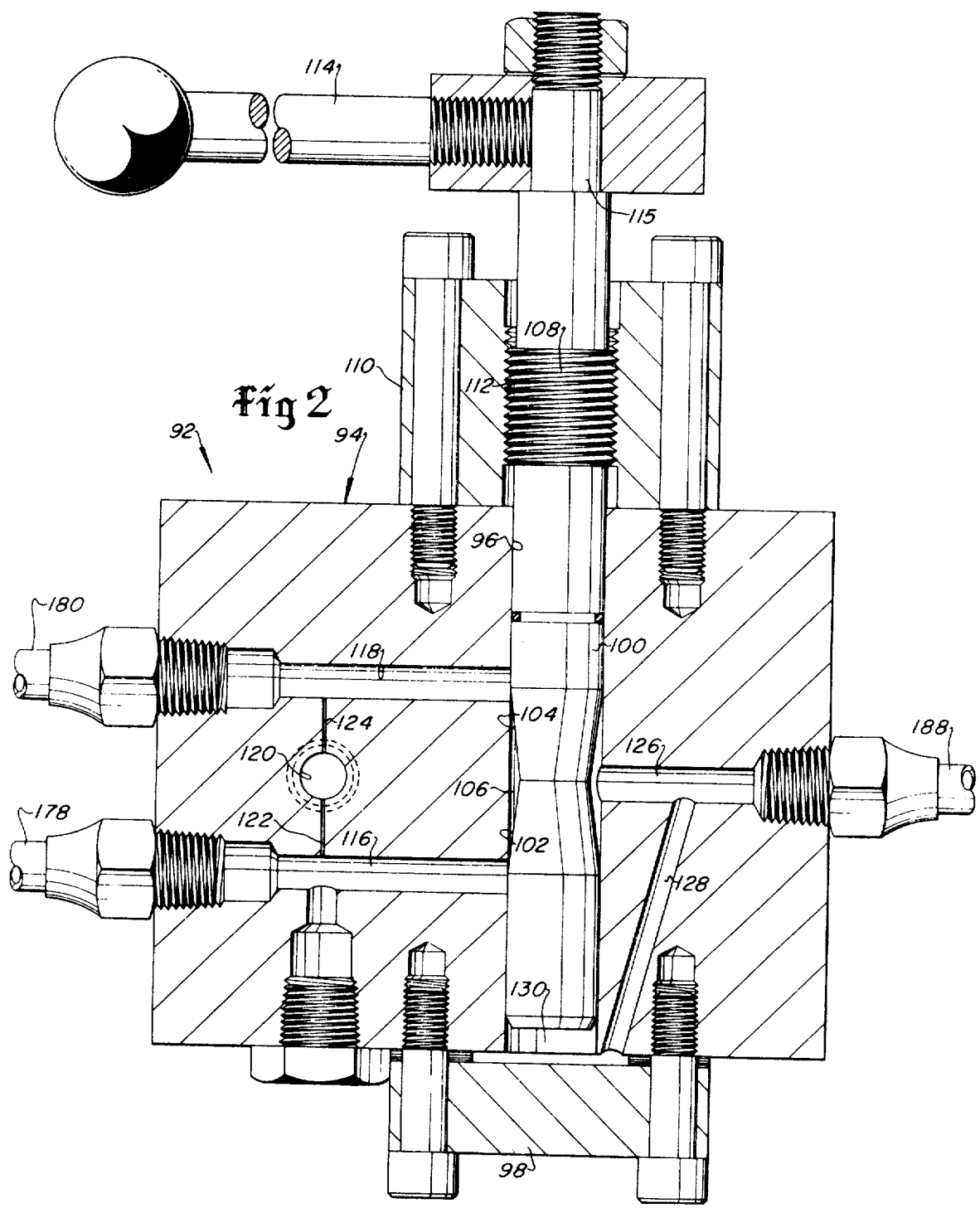
FIG. 2 is a section view of a differential pressure control valve in accordance with the present invention.

As may be appreciated from the foregoing the valve 10 may be controlled to provide direction of fluid flow, rate of flow, and pressure regulation by regulating the pressure of fluid supplied to the ports 50 and 52. Suitable means for providing pressure fluid at increased pressures to either port 50 or 52 while at the same time reducing the pressure at the respective opposite port is illustrated in FIG. 2. Referring to FIG. 2 a pilot pressure fluid control valve is illustrated and generally designated by the numeral 92. The valve 92 includes a housing 94 having a cylindrical bore 96 which is closed at one end by a cover member 98 suitably fastened to the housing 94. Disposed within the bore 96 is a cylindrical valve closure member 100 having radially inwardly sloping surfaces 102 and 104 which form a chamber 106 in the bore 96. The member 100 includes a threaded portion 108 disposed in a cover member 110 suitably fastened to the housing 94 and having a complementary threaded portion 112. The valve closure member 100 also includes an end portion 115 to which an operating handle 114 is detachably connected. In response to rotation of the valve member 100 by the handle 114 the valve member is moved longitudinally in the bore 96 by means comprising the cooperating threaded portions 108 and 112. The valve 92 also includes passages 116 and 118 in the housing 94 which intersect the bore 96. the passages 116 and 118 are in fluid flow communication with a pressure fluid supply passage 120 by way of restricted passages 122 and 124, respectively. The passages 122 and 124 may be of equal cross sectional area and length so as to provide equal resistance to fluid flow therethrough, or alternatively they may be of different proportions to allow greater flow through one passage than the other. The passages 116 and 118 may, by suitable conduit means 178 and 180, be respectively connected to the ports 50 and 52 of the control valve 10 of FIG. 1. The valve 92 also includes a fluid drain or return passage 126 intersecting the bore 96. An auxiliary drain passage 128 returns leakage fluid to the passage 126 from an end portion 130 of the bore 96.

The valve 92 is operable to raise the fluid pressure in the passage 116 and simultaneously lower the fluid pressure in passage 118 by rotation of the handle 114 to provide for movement of the member 100 longitudinally in the bore 96 away form the cover member 98. Such movement will decrease the flow area of an orifice formed between the sloping surface 102 and the intersection opening of the passage 116 with the bore 96. Simultaneously, an orifice formed by the sloping surface 104 and the intersection of passage 118 with the bore 96 will increase in area to provide for comparatively unrestricted flow of fluid from passage 118 through chamber 106 to the passage 126. Therefore, with a substantially constant pressure supply of fluid to passage 120 the above described movement of the valve member 100 will cause an increase in fluid pressure in passage 116 and a concomitant decrease in fluid pressure in passage 118. Rotation of the handle 114 to produce longitudinal movement of the member 100 in the opposite direction to that described above will result in an increase in pressure of fluid in passage 118 and a decrease in pressure of fluid in passage 116. In the position of the valve closure member shown in FIG. 2 the pressure in passage 116 and 118 will be equal and both passages will be discharging small amounts of fluid through chamber 106 to the drain passage 126. Accordingly, the valve 92 may be advantageously used in conjunction with the control valve 10 as a means of controlling the fluid pressure in the ports 50 and 52 to thereby operate the valve 10 for control of fluid flow and pressure to a reversible fluid motor or the like.

Figure 3:
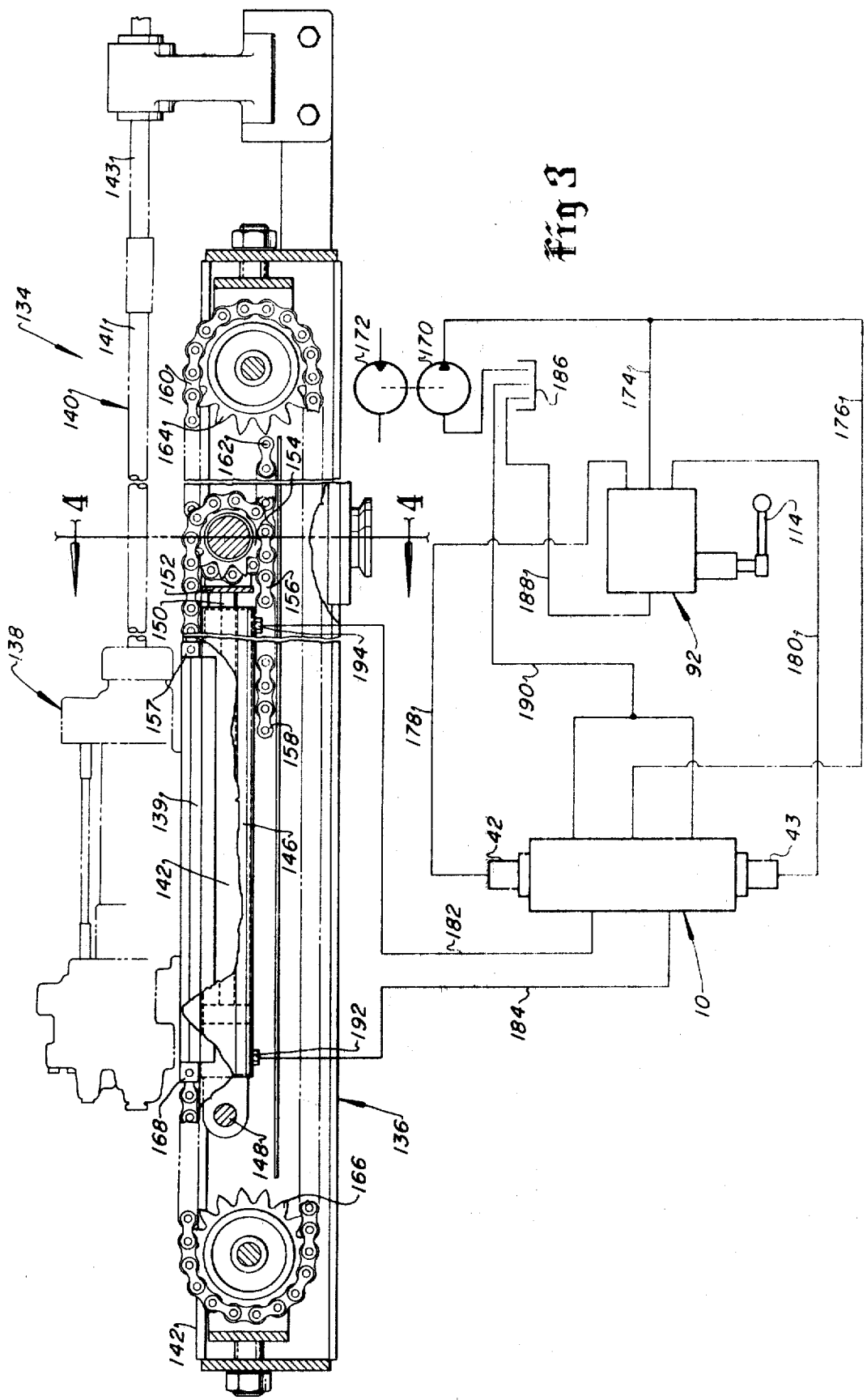
FIG. 3 is a schematic view of a control system for a rock drill feed mechanism in accordance with the present invention; and, FIG. 4 is a section view taken along the line 4—4 of FIG. 3.
Figure 4:
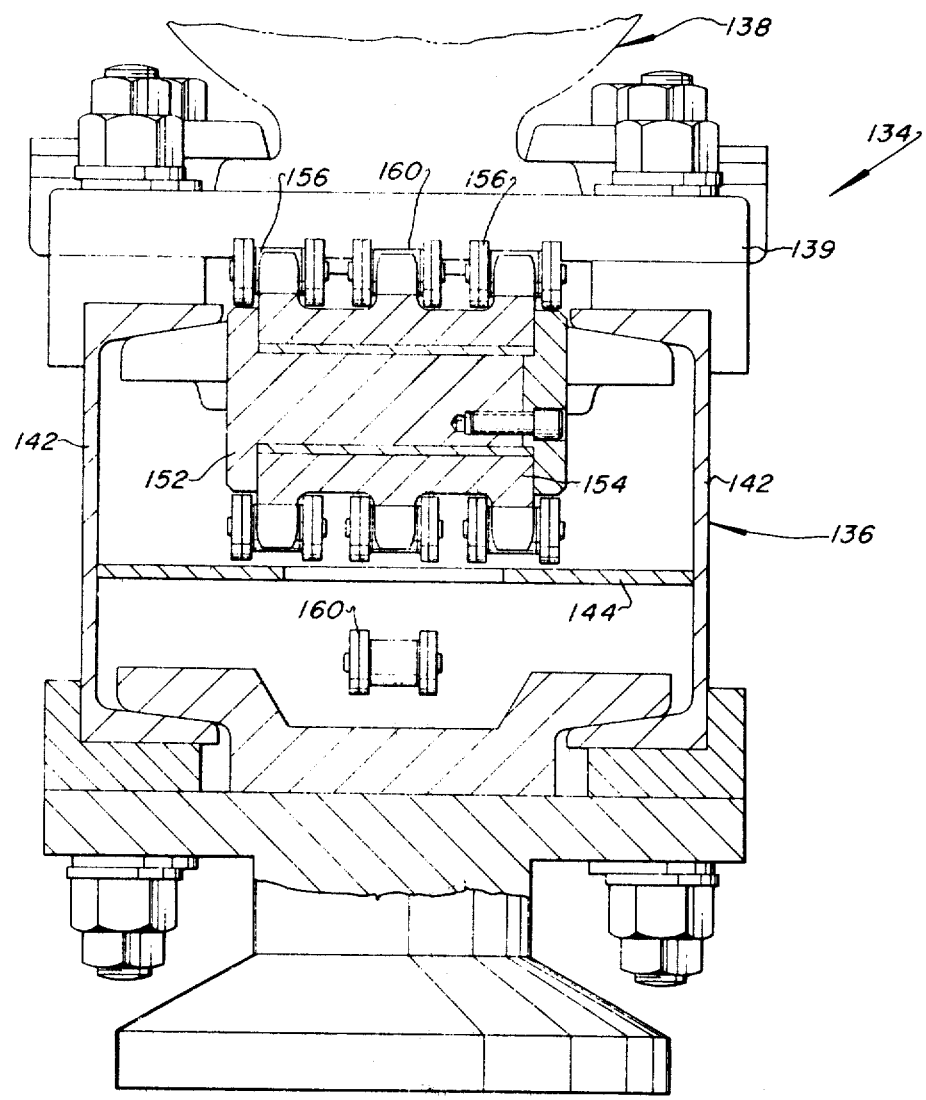

The aforedescribed control valves 10 and 92 provide for particularly superior control of rock drill feed mechanisms using reversible fluid motors for advancing and retracting a rock drill along an elongated feed support. Referring to FIGS. 3 and 4 the valves 10 and 92 are shown in a hydraulic control circuit for a rock drill feed mechanism generally designated by the numeral 134. The rock drill feed mechanism 134 is characterized by an elongated support 136 upon which is slidably mounted rock drill means 138 including a mounting plate 139. The drill 138 is operable to actuate an extension drill string 140 comprising extension drill rod members 141 and 143 coupled end to end in a manner well known. The drill 138 may be of the rotary type or the rotary percussion type, both well known in the art of rock drilling. The feed support 136 comprises elongated spaced apart members 142 suitably interconnected by support members 144. The feed mechanism 134 includes a reversible hydraulic feed motor in the form of a double acting hydraulic cylinder and piston apparatus 146. The hydraulic cylinder 146 is fixedly mounted on the feed support 136 by means of the bracket 148 and includes an extensible piston rod 150 having a bracket 152 on the distal end thereof. The bracket 152 has rotatably mounted thereon a chain sprocket 154 engaged with a pair of flexible chains 156, one shown in FIG. 3, which are suitably attached to the drill 138 at one end 157 and to the feed support 136 at their opposite ends 158. A third feed chain 160 has one end 162 secured to the feed support 136 and is engaged with the sprocket 154 as well as being reversely trained over sprockets 164 and 166 mounted at opposite ends of the support 136. The other end 168 of the chain 160 is connected to the drill 138.

The feed mechanism 134 is exemplary of one type which may be used with the below described control circuit. Feed mechanisms using reversible rotary motors in combination with cables, chains, or elongated feed screws may also enjoy the benefits of the present invention.

A control circuit for the feed mechanism 134 includes a hydraulic pump 170 which may be suitably driven by a fluid motor 172. The pump 170 is connected by way of conduits 174 and 176 to the passage 120 of valve 92 and the port 36 of valve 10, respectively, for supplying hydraulic fluid thereto at substantially constant pressure. The passages 116 and 118 of valve 92 are respectively connected to ports 50 and 52 of valve 10 by way of conduits 178 and 180. The ports 34 and 38 of valve 10 are connected to opposite ends of the hydraulic cylinder 146 by the respective conduits 182 and 184. The passages 126 in valve 92 is connected to a low pressure reservoir or tank 186 by the conduit 188 and the ports 32 and 40 of valve 10 are also connected to drain fluid to the tank 186 through conduit 190.

The control circuit of FIG. 3 is operable to supply pressure fluid to a port 192 of the hydraulic cylinder to extend the piston rod 150 and thereby pull the drill 138 along the feed support 136 by the feed chains 156. Conversely, by supplying pressure fluid to a port 194 of the cylinder the piston rod 150 will be retracted into the cylinder to pull the drill 138 in the opposite direction by means of a chain 160. In the art of rock drilling with feed supported drills it is desirable to accurately position the drill on the feed support for adding or removing extension drill rod members with respect to the drill string 140 such as the members 141 and 143 shown in FIG. 3. Accordingly, the control circuit of FIG. 3, by operation of the valve 92 to supply pressure fluid to the port 50 of valve 10 at a higher pressure than supplied to port 52, may cause the valve 10 to meter fluid to the cylinder 146 to retract the rod 150 to position the drill for adding a drill rod member to the drill string 140. For positioning the drill 138 on the feed support 136 the valve 92 will be operated to increase the pressure at either port 50 or 52 only enough to shift the spool 54 against the bias force of the opposing spring and the opposing pressure force acting on surface 83 of the respective valve element 82. Movement of the drill 138 along the support 136 for positioning purposes will normally not require substantial pressure in the cylinder 146 and the pressure of the pilot control fluid acting on the surfaces 83 may be predetermined to be sufficient to prevent movement of the valve elements 74 with respect to the spool 54. Moreover, if the drill should unexpectedly strike an obstruction or the feeding mechanism become jammed during positioning movement, the pressure of fluid supplied to the cylinder 146 would only increase to substantially the pressure of the fluid supplied to the ports 50 or 52 as the valve 10 would commence to function as a pressure regulator.

However, when the drill 138 is operated to feed the drill string with substantial force during drilling operations the pressure of fluid supplied to port 52 of valve 10 is increased by movement of the valve member 100 to further restrict the orifice formed by the passage 118 and sloping surface 104 and at the same time the pressure in port 50 is reduced to assure that the valve element 74 is free to move to connect recess 58 with recess 44. Accordingly, the fluid pressure in the cylinder 146 and at the port 38 of valve 10 will usually be sufficient, due to resistance to penetration of a rock formation by the drill string 140, to immediately move the valve element 74 to admit pressure fluid to recess 44 thereby commencing operation of the valve 10 in the pressure regulating mode to maintain a desired feed force on the drill 138.

In rock drilling operations it is also often desirable to rapidly reverse the direction of movement of the drill repeatedly in order to produce a reciprocatory pumping action with the drill string and bit portion for cleaning loose debris from the drill hole. As may be appreciated from the foregoing the control circuit of the present invention may be operated to rapidly reverse the direction of movement of the drill 138 along the support 136 by actuating the valve 92 to alternately increase the fluid pressure to one of the ports 50 or 52 of the valve 10 while decreasing the pressure at the other port to thereby shift the spool 54 to connect port 36 with either ports 34 or 38. The compact and relatively uncomplicated control circuit comprising the valves 10 and 92 is operable to control the drill 138 for positioning movement only, or for applying variable feed force with automatic regulation at the desired feed pressure. Moreover, thanks to the capability of the valve 10 to provide for controlling a substantial range of fluid flow rates through the valve, rapid movement and rapid directional change of movement of the drill 138 is also provided.

What is claimed is:

1. In combination with a rock drill feed mechanism including an elongated support, drill means mounted for reversible movement along said support, and a pressure fluid operated motor for moving said drill means reversibly along said support;

control means for said motor including a source of pressure fluid, a pair of conduits interconnecting said source of pressure fluid and said motor and the improvement characterized by:

a control valve interposed in said conduits between said source and said motor, said control valve including:

a housing;

a valve closure member disposed in said housing and movable to control the flow of pressure fluid through said conduits;

pressure fluid operated means including opposed chambers in said housing and actuating means disposed in each of said opposed chambers and responsive to pilot pressure fluid from a source admitted to one of said opposed chambers to move said closure member to provide for flow of pressure fluid through one of said conduits to said motor; and, means comprising movable valve means movable in response to a predetermined pressure in said one conduit for blocking the communication of pilot pressure fluid to the other of said opposed chambers and for communicating pressure fluid to said other opposed chamber from said one conduit to cause said actuating means in said other opposed chamber to move said closure member in opposition to the movement caused by the admission of pilot pressure fluid to said one chamber whereby the pressure of fluid supplied to said motor through said one conduit is controlled in accordance with the pressure of pilot pressure fluid admitted to said one chamber.

2. The invention set forth in claim 1 together with an operator controlled valve for supplying pilot pressure fluid to said opposed chambers for operating said control valve to control the flow and pressure of fluid supplied through said conduits to operate said motor.

3. The invention set forth in claim 1 wherein:
said closure member comprises a spool reciprocably disposed in said housing and including opposed pressure surfaces responsive to pilot pressure fluid acting thereon to move said spool to control fluid flow to said motor, and said movable valve means comprises a pair of valve elements disposed in said spool and movable to cause pressure fluid at the pressure supplied to said one conduit and said motor to act on one of said opposed surfaces in opposition to pilot pressure fluid acting on the other of said opposed surfaces for regulating the pressure of fluid supplied through said one conduit to said motor.

4. The invention set forth in claim 3 wherein:
said opposed surfaces are of equal area whereby said spool is operable to regulate the pressure of fluid supplied to said motor to a value corresponding substantially to the pressure of said pilot pressure fluid acting on said other opposed surface.

* * * * *